(12) United States Patent
Meitin

(10) Patent No.: US 7,942,777 B2
(45) Date of Patent: May 17, 2011

(54) CONTINUOUSLY VARIABLE AUTOMATIC TRANSMISSION FOR HEAVY TRUCKS, BUSES AND LIGHT AUTOMOBILES

(76) Inventor: Manuel Meitin, Miami, FL (US)

( * ) Notice: Subject to any disclaimer, the term of this patent is extended or adjusted under 35 U.S.C. 154(b) by 481 days.

(21) Appl. No.: 11/903,835

(22) Filed: Sep. 25, 2007

(65) Prior Publication Data

US 2008/0300081 A1    Dec. 4, 2008

Related U.S. Application Data

(60) Provisional application No. 60/932,589, filed on Jun. 1, 2007.

(51) Int. Cl.
*F16H 47/08* (2006.01)
*F16H 3/44* (2006.01)
(52) U.S. Cl. .............................. 475/59; 475/53; 475/318
(58) Field of Classification Search ............. 475/47–50, 475/53, 55, 57–59, 67, 68, 317, 318
See application file for complete search history.

(56) References Cited

U.S. PATENT DOCUMENTS

| | | | |
|---|---|---|---|
| 3,411,382 A | | 11/1968 | Yoichi |
| 3,503,277 A | | 3/1970 | Weinrich et al. |
| 3,559,506 A | * | 2/1971 | Tsuruya ........................ 475/57 |
| 3,747,435 A | * | 7/1973 | Welch ............................ 475/58 |
| 3,835,732 A | * | 9/1974 | Mori et al. ..................... 475/276 |
| 3,924,489 A | | 12/1975 | Yasuda |
| 4,117,745 A | | 10/1978 | Yokoyama et al. |
| 4,289,044 A | * | 9/1981 | Dorpmund et al. ............. 475/50 |
| 4,369,672 A | * | 1/1983 | Ohtsuka ........................ 475/54 |
| 4,408,501 A | * | 10/1983 | Liang et al. .................... 475/55 |
| 4,430,908 A | * | 2/1984 | Stockton ........................ 475/55 |
| 4,617,835 A | * | 10/1986 | Baker et al. .................... 477/53 |
| 4,913,002 A | | 4/1990 | Fellows |
| 4,955,851 A | * | 9/1990 | Arzoian et al. ................ 475/59 |
| 6,306,058 B1 | | 10/2001 | Meitin et al. |
| 6,371,881 B1 | | 4/2002 | Garcia Benitez et al. |
| 7,195,578 B2 | | 3/2007 | Dalenberg et al. |
| 2002/0065164 A1 | * | 5/2002 | Kato et al. ..................... 475/285 |
| 2009/0036246 A1 | * | 2/2009 | Bucknor et al. ................. 475/5 |

FOREIGN PATENT DOCUMENTS

| | | | |
|---|---|---|---|
| DE | 432755 | | 8/1926 |
| WO | WO9501522 | * | 1/1995 |

* cited by examiner

*Primary Examiner* — Roger Pang
(74) *Attorney, Agent, or Firm* — Malloy & Malloy P.A.

(57) ABSTRACT

A continuously variable, automatic transmission for a motor driven vehicle including heavy trucks, buses and light automobiles, wherein the vehicle includes an internal combustion engine and driving wheels. The automatic transmission includes a hydraulic torque converter or other hydraulic device and at least one but preferably a plurality of at least two planetary gear assemblies wherein two corresponding portions thereof are operatively interconnected by a free wheeling connector assembly. As such, torque generated by the engine of the vehicle is variably transmitted from the at least one of the planetary gear assemblies to the driving wheels of the vehicle.

1 Claim, 5 Drawing Sheets

CONTINUOUSLY VARIABLE AUTOMATIC TRANSMISSION FOR HEAVY TRUCKS, BUSES AND LIGHT AUTOMOBILES

CLAIM OF PRIORITY

The present application is based on and a claim of priority is made under 35 U.S.C. Section 119(e) to a provisional patent application that is in the U.S. Patent and Trademark Office, namely, that having Ser. No. 60/932,589 and a filing date of Jun. 1, 2007.

BACKGROUND OF THE INVENTION

1. Field of the Invention

This invention relates to a continuously variable automatic transmission for motorized vehicles including heavy trucks, buses as well as light automobiles. The transmission includes a hydraulic device such as, but not limited to, a hydraulic torque converter and one or more planetary gear assemblies operatively interconnected to one another and connected in a predetermined manner to the output of the vehicle engine and the hydraulic device so as to accomplish the variable transmission of torque to the driving wheels of the vehicle.

2. Description of the Related Art

A typical automatic transmission usually comprises a hydraulic torque converter, a planetary gear ensemble, some brake devices and a control system, for transmitting a torque generated by an internal combustion engine to the driving wheels, wherein the torque is usually transmitted in several stages.

A more recently developed transmission generally includes a set of adjustable pitch pulleys in cooperation with a belt for variably transmitting the torque from drive engine of the vehicle to the driving wheels thereof. Belt structures of the type referred to have been improved several times in order to provide a better resistance against breaking and wear. However, only a limited torque transmission is capable of using such technology.

According to the present invention, the torque generated by the vehicle engine is transmitted to the driving wheels by combining the operative features and components of an automatic transmission with the performance and benefits of a continuously variable transmission. As a result the preferred embodiments of the variable automatic transmission of the present invention are suitable for use on heavy duty trucks as well as lighter automobiles. Moreover, the results in doing so include an improve fuel economy, a reduction in emissions from engines exhaust gasses, lower production and maintenance costs and an increased durability.

SUMMARY OF THE INVENTION

It is therefore an object of the present invention to provide an improved continuously variable automatic transmission in order to increase performance and engine life.

It is another object of the invention to provide a strong structural transmission combined with a simple design, fewer parts and high performance efficiency.

It is also an object of the invention to increase torque capacity as needed for a practical applicability to heavy duty trucks, any kind of buses as well as passenger automobiles.

It is another object of the invention to provide an improved transmission at a lower production cost because less parts and less devices are involved.

It is an object of the invention to provide a transmission which allows reducing emissions from the engines exhaust gases.

It is another object of the invention to provide a transmission which allows an improvement in fuel economy.

These and other objects, features and advantages of the present invention will become more clear when the drawings as well as the detailed description are taken into consideration.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

The present invention is directed to an automatic transmission structured to continuously transmit a variable torque from the internal combustion or other drive engine of the vehicle to the driving wheels thereof.

More specifically, the various embodiments of the present invention include a hydraulic torque converter or similar hydraulic device and at least one but preferably a plurality of at least two planetary gear assemblies. In addition, corresponding portions of a first planetary gear assembly and a second planetary gear assembly are operatively interconnected for substantially concurrent operation by a connector assembly of predetermined construction. As pointed out in greater detail hereinafter, the connector assembly comprises a free wheeling device which facilitates both concurrent movement and non-movement of predetermined portions of the first and second planetary gear assemblies. As such, the various preferred embodiments of the present invention are structured to continuously vary the torque, generated by the internal combustion engine or other drive engine of the vehicle, which is transmitted as needed to the driving wheels of the vehicle.

Figure 1:
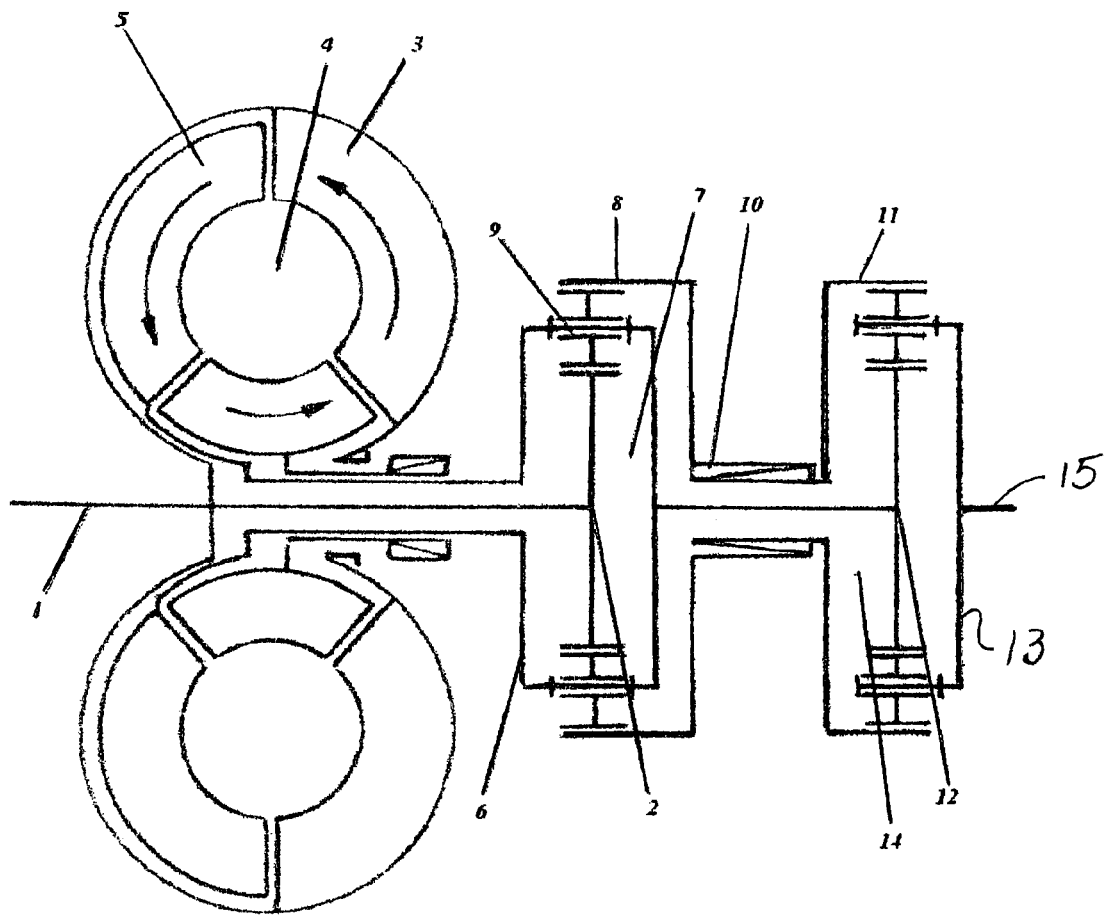
FIG. 1 illustrates the first embodiment of the transmission of the present invention.

Accordingly and with primary reference to the preferred embodiment of FIG. 1, engine torque is transmitted, by means of input shaft 1, from the drive motor of the vehicle to an inner sun gear 2 of the first planetary gear assembly 7. Concurrently, the output from the drive motor of the vehicle is connected to a pump portion 3 of the hydraulic converter 4. In addition, the hydraulic converter 4 includes a turbine 5 which is hydraulically driven, under specific operating conditions, by the pump 3. Moreover, the turbine 5 is connected in driving relation to a first carrier 6 associated with the first planetary gear assembly 7. The first carrier 6 is disposed and structured to support a plurality of planetary gears 9 in interconnecting relation between the sun gear 2 and an outer ring gear 8 both considered a part of the first planetary gear assembly 7.

As also represented in the embodiment of FIG. 1, a second planetary gear assembly 14 comprises an inner sun gear 12, an outer ring gear 11 and a plurality of planetary gears 9 movably supported in interconnecting relation between the sun gear 12 and the ring gear 11. Further, a second carrier 13 is connected in torque transmitting relation to the drive wheels of the vehicle, such as by power take off or output 15.

Figure 5:
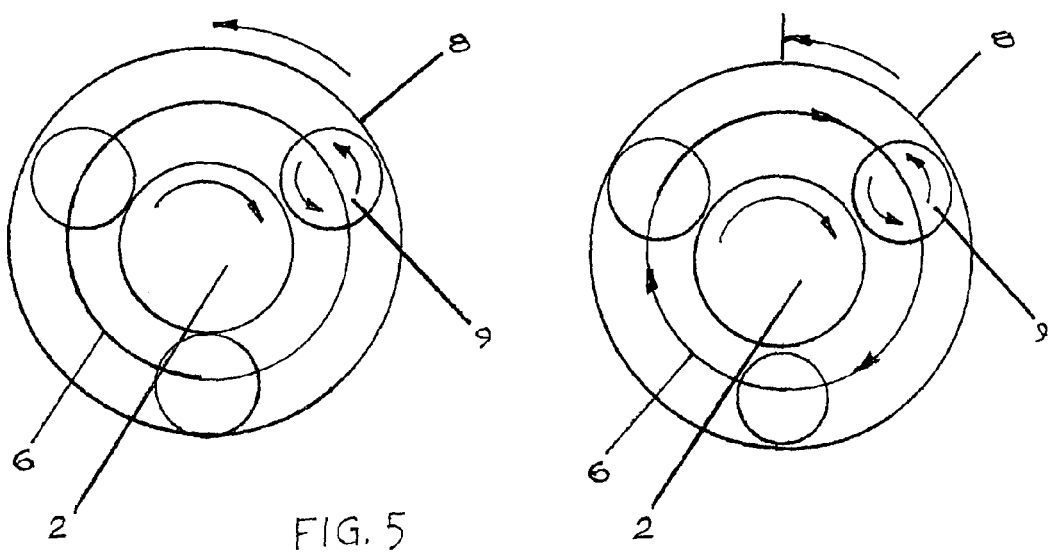
FIG. 5 shows a schematic representation of a planetary gear assembly incorporated in the various preferred embodiments of the present invention.

With primary reference to the embodiment of FIG. 1 and with additional reference to the embodiment of FIG. 5, under idle engine running conditions of the vehicle, no movement is transmitted from the pump 3 to the turbine 5. This is due to the fact that oil or hydraulic fluid flow inside the hydraulic converter 4 is not sufficient to cause a driving of the turbine 5. As represented in FIG. 1, during these idle running conditions, the ring gear 8 of the first planetary gear assembly 7 is forced to rotate or travel in an opposite direction to that of the rotation of the vehicle motor, due to the rotational movement of the plurality of planetary gears 9 of the first planetary gear assembly 7 being supported by the first carrier 6.

Another feature of one or more preferred embodiments of the present invention is the provision of a connector assembly 10. The connector assembly 10 is preferably in the form of a free wheeling device serving to operatively interconnect corresponding portions including ring gears 8 and 11 of the first and second planetary gear assemblies 7 and 14, respectively. As such, the free wheeling device and/or connector assembly 10 is structured to facilitate concurrent movement or concurrent non-movement of the outer ring gears 8 and 11 of the first and second planetary gear assemblies 7 and 14. Accordingly, while both ring gears 8 and 11 are forced to rotate in the opposite direction, as set forth above, no rotation or translational movement of the first carrier 6 and corresponding plurality of planetary gears 9 occurs about the sun gear 2.

Figure 4:
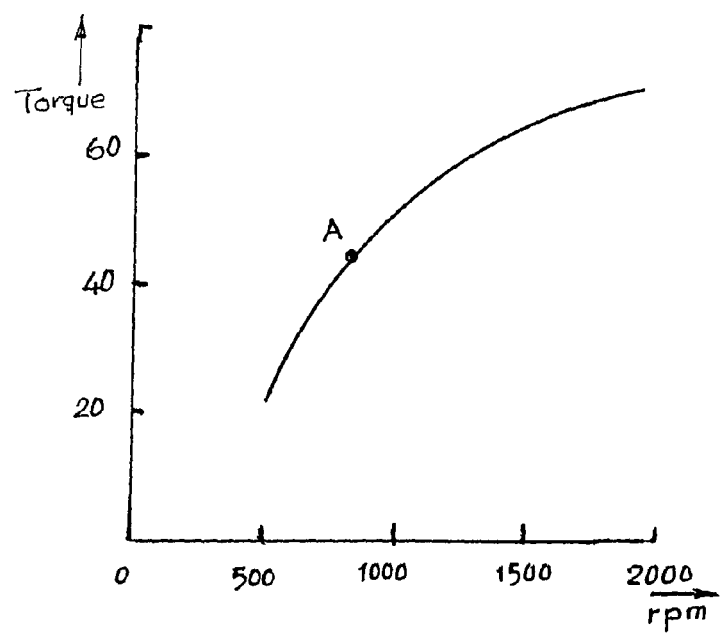
FIG. 4 represents a graph showing a typical torque converter performance curve.

Upon an increase in engine rotation to the extent that "stall point" A, schematically represented in FIG. 4, is overcome, the driving movement of the turbine 5 will begin. With respect to FIG. 4, point A represents the "stall point" meaning that it is the point of maximum engine RPM operation in which the turbine 5 remains motionless.

Accordingly, assuming that the stall point A of FIG. 4 is the highest point at which the turbine 5 of the hydraulic converter 4 remains motionless, overcoming the stall point A, such as by increasing the speed engine, serves to allow a driving interaction of the turbine 5. This serves to drive the first carrier 6 while the rotation or movement of the ring gear 8, in the opposite direction, will stop and begin to rotate in the same direction as the sun gear 2, when the engine rotation is increased. As also represented in the embodiment of FIG. 1, the sun gear 12 of the second planetary gear assembly 14 is connected and driven by the first carrier 6 of the first planetary gear assembly 7.

However, regardless of the driving engagement and rotational movement of the sun gear 12 by the first carrier 6, the ring gears 8 and 11 of the respective first and second planetary gear assemblies 7 and 14, will remain stopped at this point due to their interconnection by the connector assembly or free wheeling device 10. As a result of the operative interconnection of corresponding portions, comprising the outer ring gears 8 and 11, the second carrier 13 of the second planetary gear assembly 14 will begin to rotate. Such rotation of the second carrier 13 will be sufficient to transmit the highest torque to the drive wheels of the vehicle through power take-off 15.

Further, when the vehicle is running on a level, straight away at substantially normal cruising speeds, the rotational speed of the pump 3 and turbine 5 of the hydraulic converter 4 becomes substantially similar. Accordingly, the rotation of the sun gear 2 and the first carrier 6 similarly become almost equal, wherein the first planetary gear assembly 7 can be said to rotate in unison as a whole.

Due to the fact that the first carrier 6 of the first planetary gear assembly 7 is connected in driving relation to the sun gear 12 of the second planetary gear assembly 14 and also that the ring gear 11 is connected in concurrent operative motion or non-motion to the ring gear 8, the second planetary gear assembly 14 can also be described as rotating in unison, as a whole. By virtue of this mode of operation, the lower gear ratio provided by the automatic transmission as represented in the preferred embodiment of FIG. 1 is transmitted to the driving wheels of the vehicle.

In contrast, if a significant resistance is applied to the driving wheels of the vehicle such as, but not limited to, when the vehicle travels up an incline, the additional resistance to the drive wheels of the vehicle is reflected in the operation of the turbine 5. More specifically, a sliding relation is produced between the turbine 5 and the pump 3 resulting in a difference in rotational speed between the first carrier 6 and the sun gear 2 of the first planetary gear assembly 7. As a result, the ring gear 8 turns at a lower speed because of the difference in gear ratios of the gears of the first planetary gear assembly 7. Moreover, in that the first carrier 6 is connected in driving relation to the sun gear 12 of the second planetary gear assembly 14 and the fact that the ring gears 8 and 11 are operatively interconnected to move or not move concurrently relative to one another by virtue of the connector or free wheeling device 10, a variable torque is delivered to the output 15, depending, at least in part, on the resistance to which the driving wheels and/or vehicle is subjected.

Figure 2:
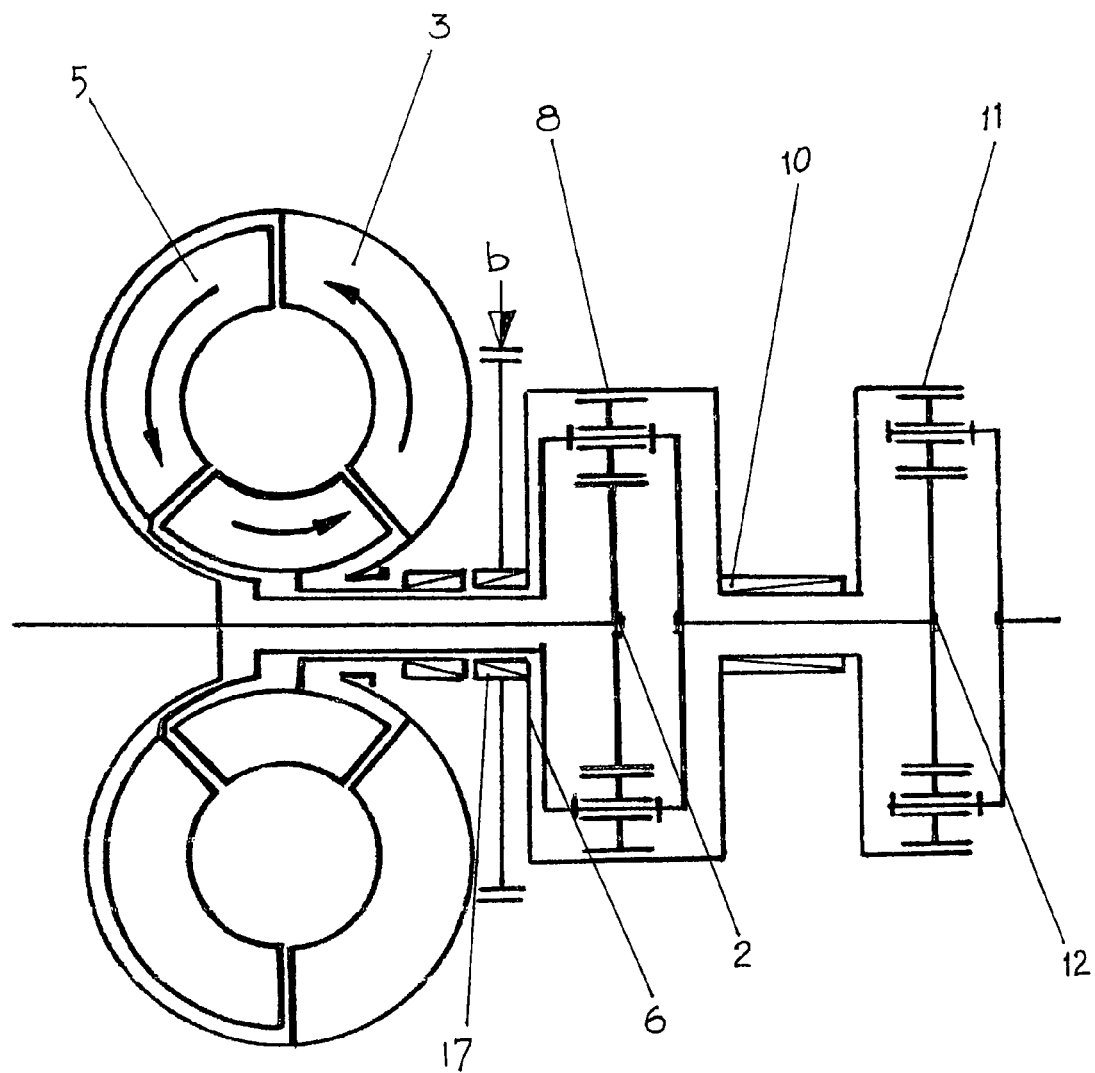
FIG. 2 illustrates a second embodiment of the transmission of the present invention.

With primary reference to the preferred embodiment of FIG. 2, the torque generated by the engine is concurrently transmitted to the sun gear 2 of the first planetary gear assembly 7 and to the pump 3 of the hydraulic converter 4. Accordingly, when an automobile starts moving, excessive sliding frequently occurs between the pump 3 and the turbine 5 because of the insufficiency of hydraulic fluid, such as oil, toric flow through the converter 4. As a result, the hydraulic converter 4 operates at a very low efficiency. In order to avoid the effects of such an excessive sliding of the pump 3 and turbine 5 of the hydraulic torque converter 4 at this time and for purposes of increasing fuel economy and efficiency, structural modifications may be made to the embodiment of FIG. 1. Such structural modifications are represented in the preferred embodiment of FIG. 2 and comprise the inclusion of a brake assembly generally indicated as b connected in braking relation to the ring gear 8 of the first planetary gear assembly 7. Further, a connecting assembly 17 may be disposed and structured to interconnect the braking assembly b to the outer ring gear 8, in order to permit the rotation of the ring gear 8 in the same sense as the sun gear does, when the rotational speed of the sun gear 2 and first carrier 6 substantially correspond.

Accordingly, when the brake assembly b is activated, the ring gear 8 is stopped in at least one direction because of the action provided by the free wheeling connecting assembly 17. As a result, the first carrier 6 begins to move because of the rotation of the sun gear 2 and the rotation of the planetary gears 9 on their respective axles which are fixed to the carrier 6. As set forth above with regard to the preferred embodiment of FIG. 1 and as is present in the structure and operation of the embodiment of FIG. 2, the outer ring gears 8 and 11 of the first and second planetary gear assemblies 7 and 14 are interconnected so as to concurrently operate (concurrently move or don't move) by means of the free wheeling connector assembly 10. In addition, the first carrier 6 is also connected in driving relation to the sun gear 12 of the second planetary gear assembly 14. As a result, a mechanical start is officially obtained. If engine rotation is increased and the stall point A of FIG. 4 is overcome, the hydraulic transmission of torque occurs by means of a turbine 5 being connected in driving relation to the carrier 6. If there is no significant additional resistance applied to the driving wheels, the pump 3 and the turbine 5 of the hydraulic torque converter 4 rotate at a substantially equivalent speed. As such, the first carrier 6 and the sun gear 2 serves to drag the ring gear 8, wherein the entire first planetary gear assembly moves in unison, as a whole. Such complete rotation of the first planetary gear 7 assembly is permitted to due the presence of the free wheeling connecting assembly 17 as represented in FIG. 2.

Further, the brake device b may vary in construction with the extent that appropriate operation thereof serves to selectively brake the ring gear 8. Further, the selected, appropriate brake assembly b works in cooperation with the free wheeling connecting assembly 17. Therefore, in the additional preferred embodiment of FIG. 2, the mechanical and selective stopping of the ring gears 8 and 11 avoids the less efficient regulation of these ring gears 8 and 11 by the hydraulic torque converter 4. As a result, better fuel economy and a faster start is obtained.

Figure 3A:
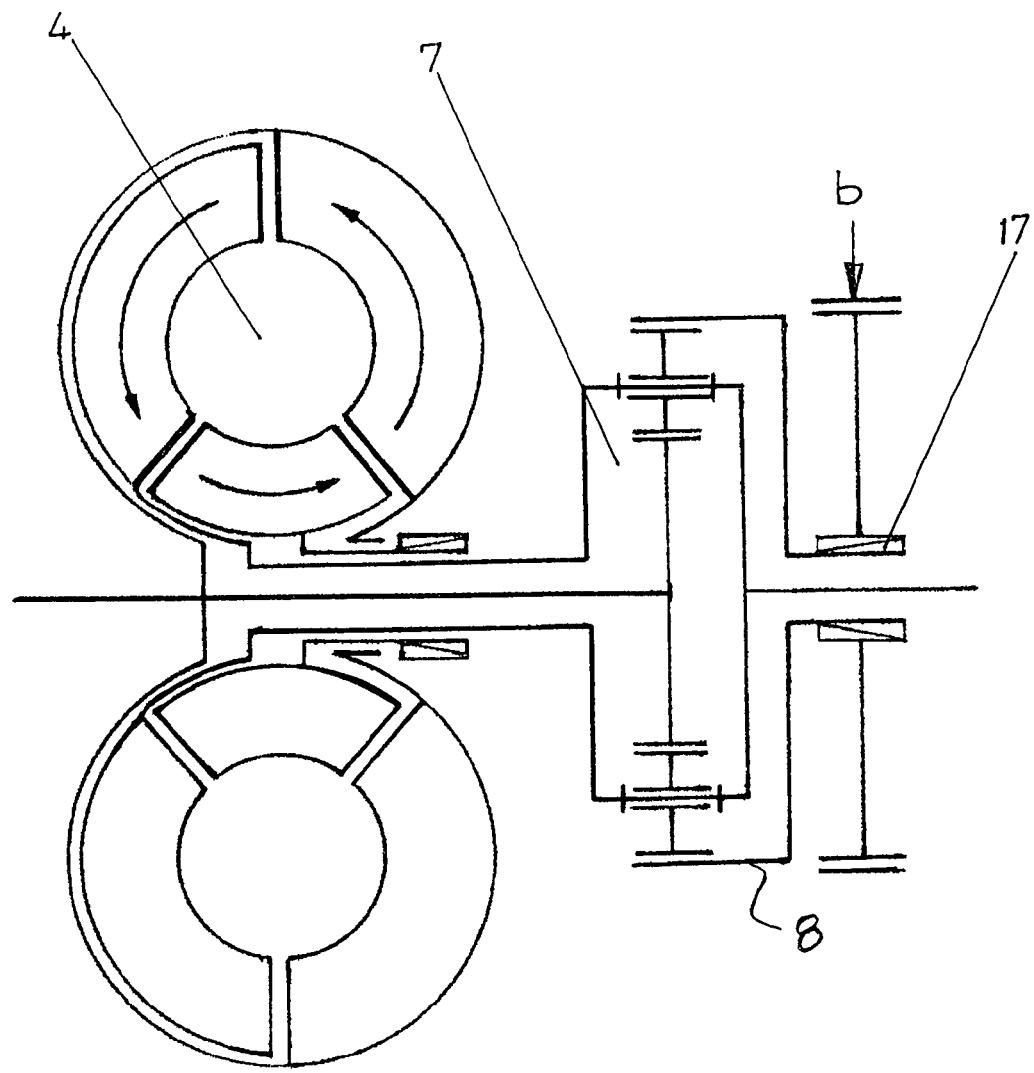
FIGS. 3a and 3b illustrate a third embodiment of the transmission of the present invention.
Figure 3:
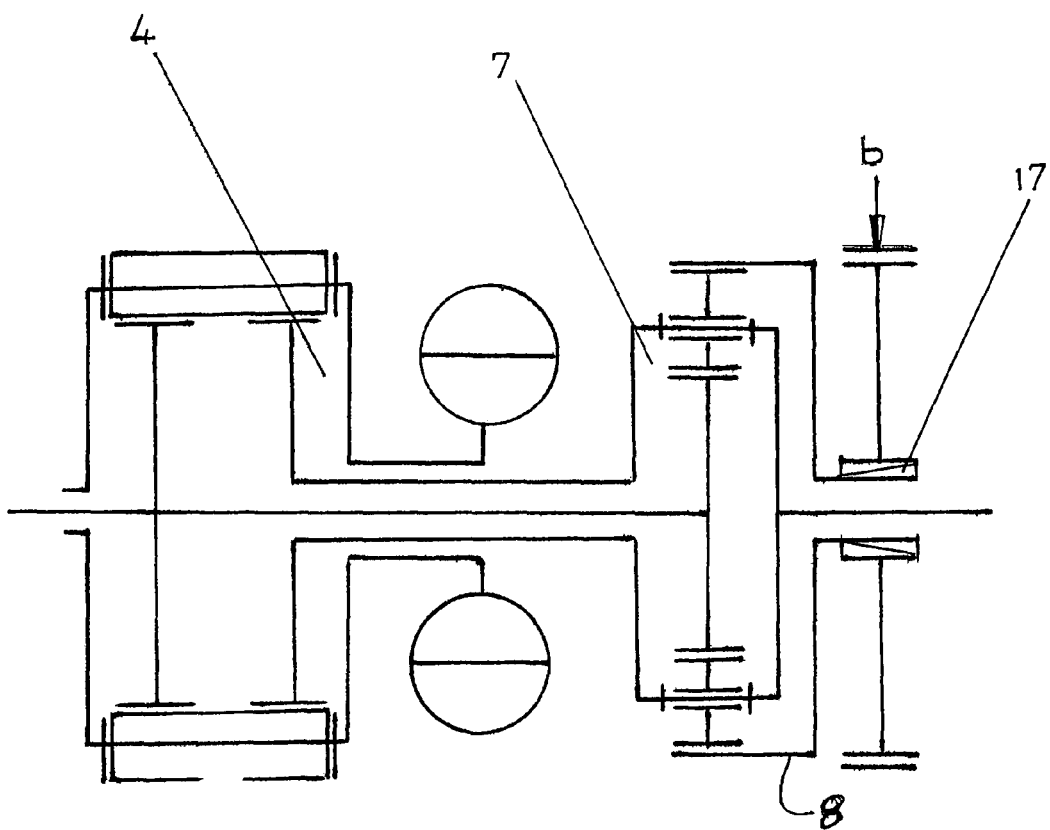

A third embodiment is represented in FIGS. 3a and 3b and is perhaps more suitable for vehicles in the form of lighter vehicles such as, but not limited to passenger automobiles rather than heavier trucks, buses or the like. As such, the preferred embodiment of FIG. 3 comprises the hydraulic torque converter or similar hydraulic device 4, a single planetary gear assembly 7, and a brake device b associated with a free wheeling device 17 serving to selectively and mechanically stop the ring gear 8. Moreover, the preferred embodiment of FIG. 3 is similarly operative as compared to the preferred embodiment of FIG. 2 with the difference being the availability of a limited gear ratio obtained when operating the preferred embodiment of FIG. 3 having only a single planetary gear assembly. Accordingly, this embodiment provides a simpler, more efficient and cheaper structure to operate.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,
What is claimed is:

1. A continuously variable automatic transmission for a vehicle for changing over between a lowest torque to a highest torque provided by the transmission, in a gradual and variable way without steps or shifts, in such a way an output speed and torque can be gradually changed, comprising:
   one planetary gear mechanism, having a sun gear, an internal gear, a plurality of planet gears and a planet carrier;
   an input shaft connected at one end to a prime mover and at the other end thereof to said sun gear which is never connected rotatably with a turbine output shaft of a hydraulic torque converter, said input shaft is also connected with a pump of a torque converter;
   an intermediate shaft connected at one end to the turbine output shaft of said hydraulic torque converter and at the other end with the carrier of said planetary gear mechanism;
   a permanent engaged one way brake, allowing said internal gear of said planetary gear assembly for being rotated free in the same direction of that of said input shaft when the torque provided by said hydraulic torque converter is enough for moving the vehicle;
   and an output shaft connected at one end to the carrier of said planetary gear mechanism and at the other end to the driving wheels of the vehicle.

* * * * *